No. 869,286. PATENTED OCT. 29, 1907.
W. E. WINSHIP.
ELECTRICAL SYSTEM OF DISTRIBUTION.
APPLICATION FILED MAR. 7, 1907.
3 SHEETS—SHEET 2.
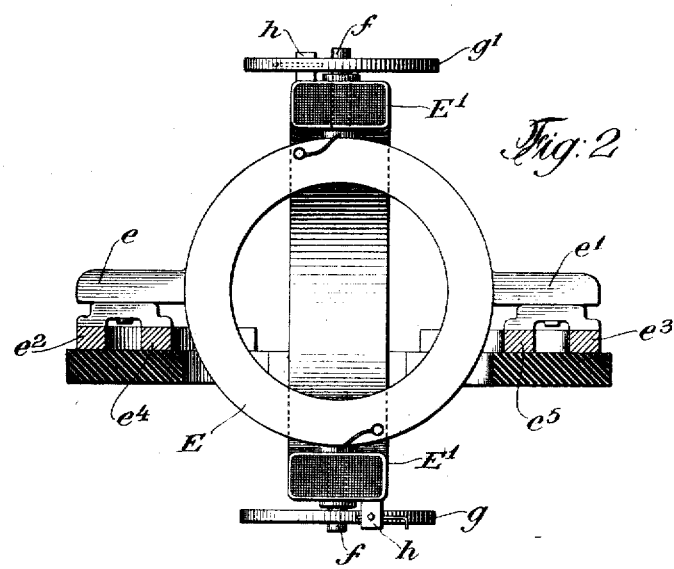
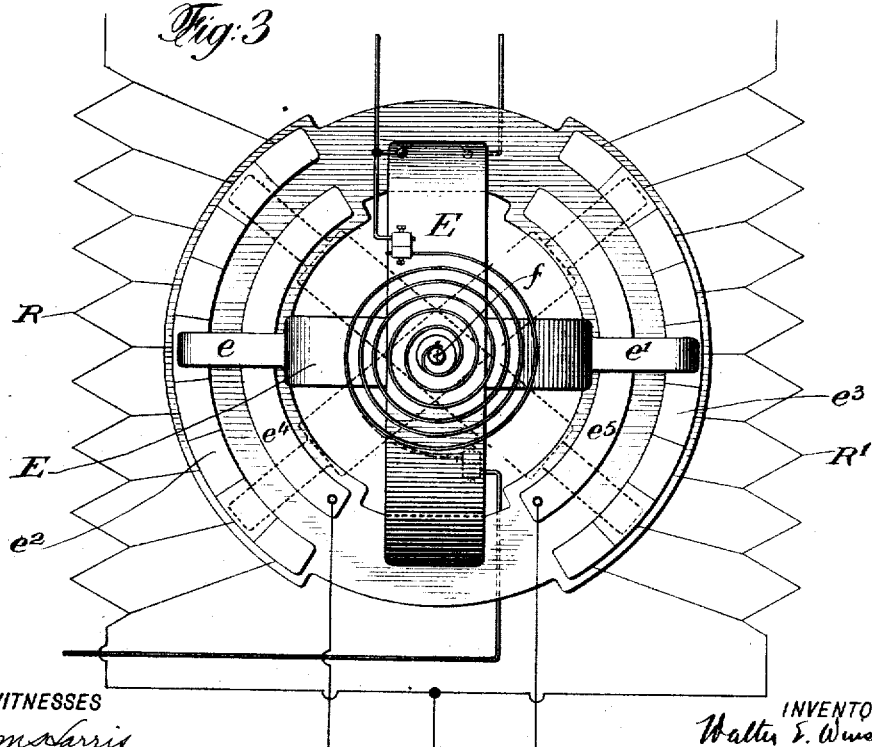
WITNESSES
INVENTOR
Walter E. Winship
BY
Kenyon & Kenyon
his ATTORNEYS

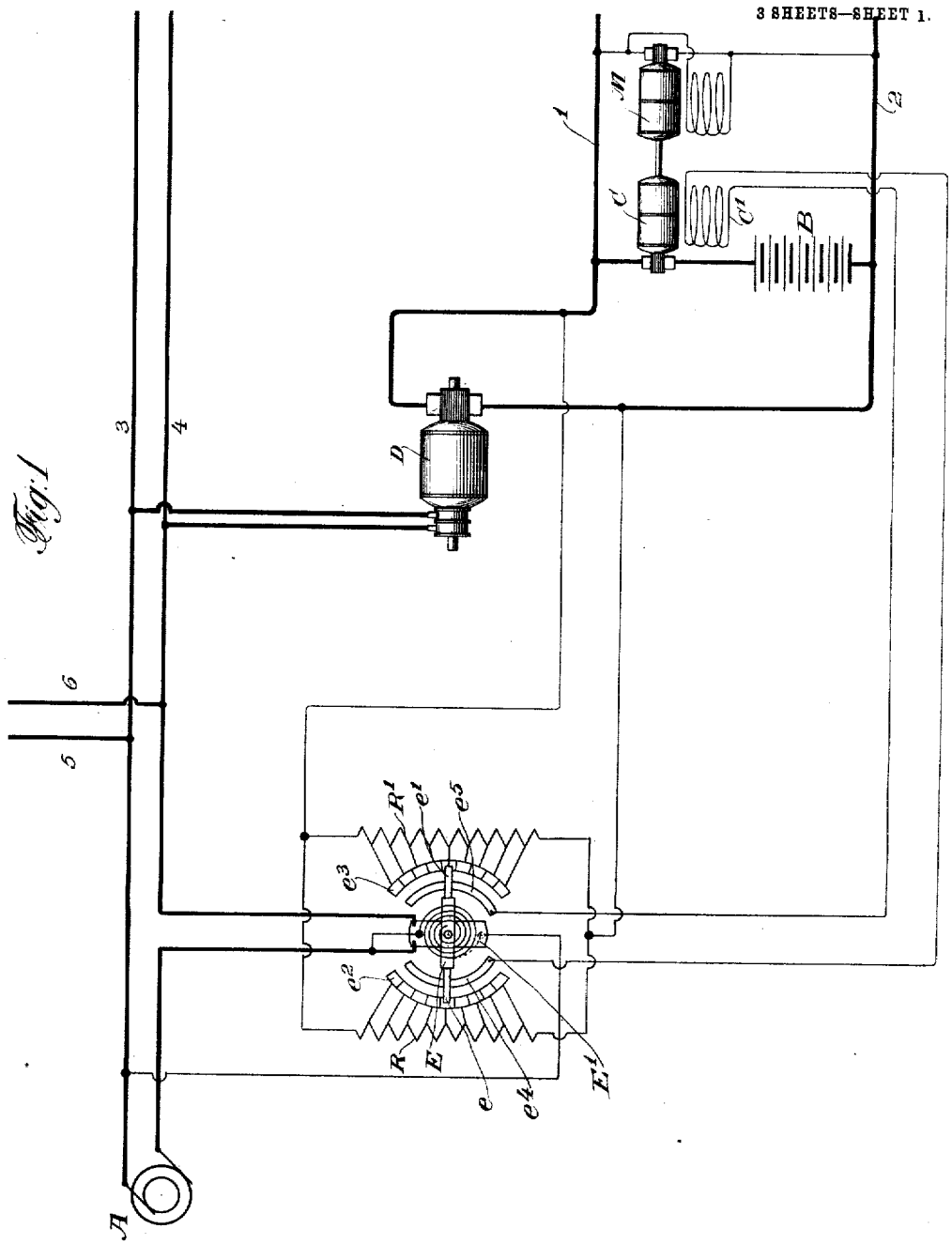

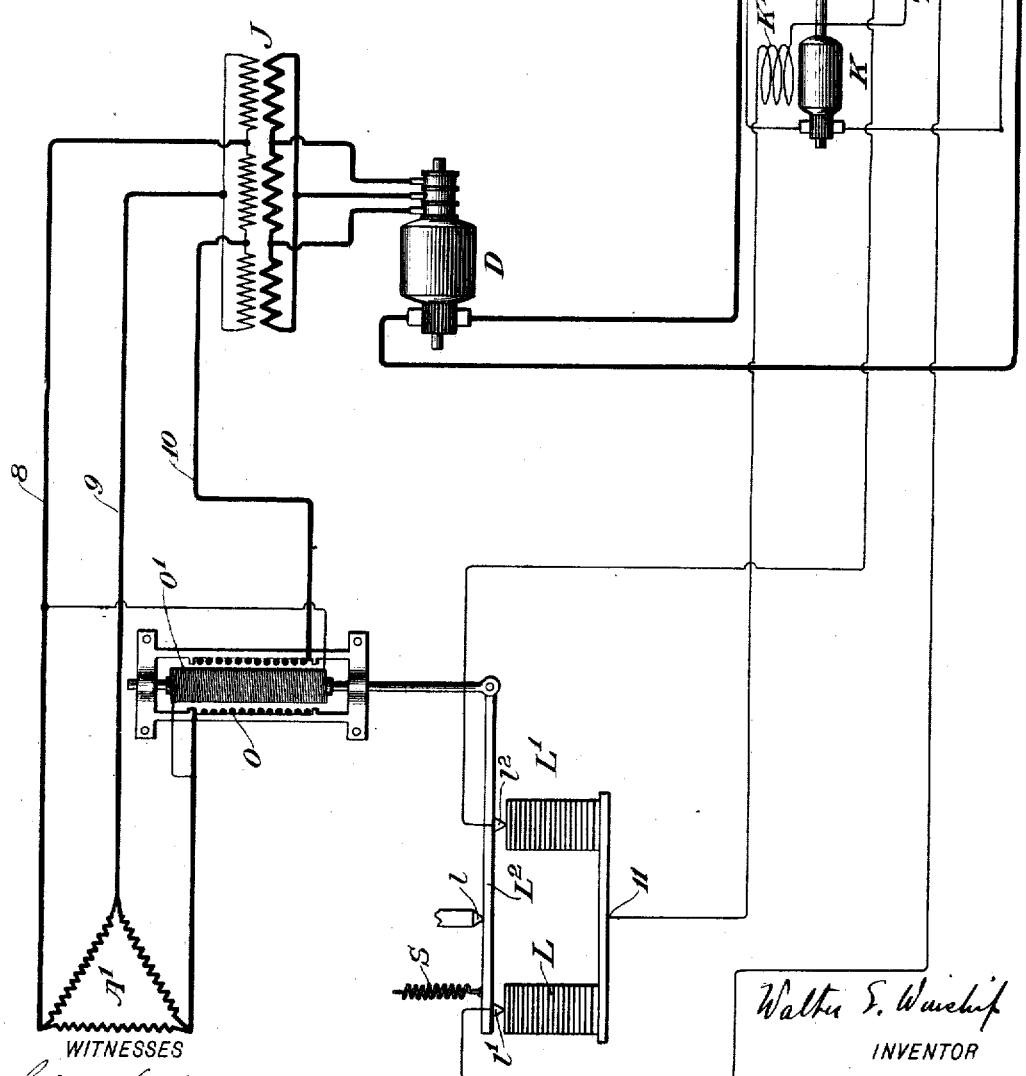

UNITED STATES PATENT OFFICE.

WALTER E. WINSHIP, OF NEW YORK, N. Y., ASSIGNOR TO GOULD STORAGE BATTERY COMPANY, A CORPORATION OF NEW YORK.

ELECTRICAL SYSTEM OF DISTRIBUTION.

No. 869,286.

Specification of Letters Patent.

Patented Oct. 29, 190⁊.

Application filed March 7, 1907. Serial No. 361,148.

*To all whom it may concern:*

Be it known that I, WALTER E. WINSHIP, a citizen of the United States, and a resident of New York city, county and State of New York, have invented certain new and useful Improvements in Electrical Systems of Distribution, of which the following is a specification.

This invention relates to electrical systems of distribution and more particularly to systems employing an electric storage apparatus such as a storage battery to steady the load on an alternating current generating plant.

According to my invention the battery is controlled responsively to the true energy variations of the alternating current generator, preferably by varying the electro-motive-force of a booster in series with a battery responsively to said variations. The true energy of an alternating current is measured by the product of the current and electro-motive-force of said circuit and the cosine of the angle of phase difference between them. By regulating in accordance with changes in this product I am enabled to maintain the actual mechanical or other power applied to rotate the generator at great uniformity, since my regulation compensates for changes in every factor that takes part in causing a change of power.

Specifically my invention includes the regulation of the battery by regulating the booster responsively to the relative movement of two coils, which relative movement is caused by their magnetic relation to each other. One of said coils is located to be responsive to current changes on the alternating current generator, and the other to voltage changes thereof. The torque reaction between the two coils is, in accordance with well known laws, the product of their magnetizing forces and the cosine of the angle of phase difference between them. As their magnetizing forces are respectively proportional to current and voltage changes of the generator, the result is that the torque between these two coils is responsive to variations of true energy of the generator.

Other features of my invention include more specific features of combination and arrangement as hereinafter described, by which I obtain the control above specified.

Referring to the drawings, Figure 1 is a diagrammatic illustration of a simple form of my invention. Figs. 2 and 3 are enlarged views showing the dynamometer diagrammatically indicated in Fig. 1. Fig. 4 is a diagrammatic illustration of a modification of the invention.

Referring first to Fig. 1, A represents a source of alternating current which may be one or more main generators at a central station or any equivalent at a sub-station, or any other suitable source of alternating current. B represents a storage battery and C a booster armature in series therewith, the two being connected to a direct current circuit 1—2. D is a rotary converter or other suitable rectifying apparatus, preferably reversible in character, whose direct current end is connected to the circuit 1—2, while its alternating current end is connected to the circuit 3—4 from the generator A. 5—6 indicates an alternating current work circuit. According to my present invention the work circuit may be either an alternating current one or a work circuit connected to the direct current lines 1—2, or there may be work circuits connected to each side of the system.

The current in the booster field coil $C'$ is varied in direction and amount by the movement of the contacts $e$, $e'$ of a reversing rheostat. These contacts are carried by a moving coil E. This coil has connected to it two pivots $f$ which extend through a fixed coil $E'$. The fixed coil is connected in series in the main 4, while the moving coil is connected through the springs $g$, $g'$ across the circuit 3—4 to be responsive to voltage variations thereof. The moving coil therefore tends to move in one direction in accordance will the well known dynamometer principle, the torque exerted being equal to the product of the magnetizing forces and the cosine of the angle of phase difference between them. This movement is opposed by the springs $g$, $g'$, one end of each of which is connected to one of the pivots $f$, while the other end is connected to a fixed abutment $h$. As the moving coil turns in its bearings, the contacts $e$, $e'$ sweep over the fixed contacts $e^2$ and $e^3$ which are respectively connected to resistances R, R'.

In the system illustrated in Fig. 1 the resistances R, R' are at one end connected together and to the conductor 1 on one side of the direct current circuit. The other ends of the resistances are also connected together and to the conductor on the other side of the direct current circuit. The booster field coil $C'$ is connected at its terminals to the contacts $e^4$ and $e^5$ respectively. These are constantly engaged by the contacts $e$, $e'$ respectively. The contacts $e$, $e'$ are therefore always connecting the segments $e^4$, $e^5$ respectively with one or other of the contacts $e^2$, $e^3$.

When the moving coil is at the position shown in Fig. 1 and the full line position of Fig. 3 the booster field winding $C'$ is without current because there is the same potential difference at each terminal of the coil. When the true energy given out by generator A increases, thereby increasing the torque between the coils E and E', then the moving coil moves toward one of the dotted line positions shown in Fig. 3 against the opposition of the springs $g$, $g'$. This causes a current in the proper direction and of the proper magnitude to pass through the booster field $C'$ to cause a proper electro-motive-force to be developed in the booster armature C, thereby enabling the battery to discharge to the work circuit. When the true energy on generator A has fallen below the average for which the apparatus is adjusted, then the moving coil moves in the opposite direction as, for example, to the other dotted line position in Fig. 3, this movement being caused by the springs g, g' overcoming the decreased torque between the coils. Under these circumstances a current in the opposite direction traverses the field winding C' and part of the energy of the generator is used to charge the batteries.

In Fig. 4 I have shown a modification to which, however, the principles of my invention are equally applied. In this case the generator is shown at A' as a polyphase generator. The rectifier D is supplied through stepdown transformers H. The booster field winding C² is in the present instance supplied by the armature K of an exciter. Preferably this exciter and the booster are both operated by the motor M. The electro-motive-force of the exciter is controlled by varying the resultant of the opposing potential differences applied to the field coil K' thereof. This is effected in the present instance by connecting one terminal of field coil K' to a point 7 of the battery, while varying the potential difference at the other terminal of said field winding both above and below the potential difference of point 7. This is effected by operating a carbon regulator by true energy changes in the manner heretofore set forth. Thus L, L' indicate two carbon piles. L² is a pivoted lever fulcrumed at l and bearing at l', l² upon the tops of the carbon piles. A spring S tends to move the lever L² in one direction, so tending to relieve the pressure upon the pile L and increase the pressure upon the pile L'. Acting in opposition to this spring is the electro-responsive device comprising a fixed coil O and a movable coil O', the moving coil being mechanically connected to the lever L². In the present instance the fixed coil O is shown as connected in series with one of the conductors 8, 9, 10 leading from the generator A', while the moving coil is connected across the conductors 8 and 10 to be subjected to voltage variations of the generator. In this case, therefore, as in the other case, the torque exerted by the magnetic reaction between these coils will be proportional to the product of the current and electro-motive-force of the generator A' and the cosine of the angle of phase difference between said electro-motive-force and current.

When the true energy of generator A' is at the desired average then the torque exerted upon the moving coil is such as, acting against the spring S, to make the pressure upon the two carbon piles equal. Their resistances will therefore be equal. Under these conditions the potential at the point 11 will be the same as the potential at the point 7, whereby the exciter field K' will be without current and the booster will not be producing electro-motive-force. When the true energy of the generator is above this value the pressure upon pile L will increase and that upon pile L' decrease, so producing a substantial difference in the relative resistances of the two piles, whereby the potential at points 11 and 7 will be substantially different and a current in one direction will traverse the field winding K' of the exciter and cause an electro-motive-force to be generated by the exciter and therefore the booster field to be energized. The decrease in the true energy of generator A below the average reverses this effect, the spring S overcoming the pull of the coil O' so that current is produced in the exciter field K' in an opposite direction producing a booster electro-motive-force in an opposite direction.

The specific apparatus shown in connection with Fig. 4 for a polyphase circuit operates satisfactorily if the system is substantially a balanced one. Where the system is substantially unbalanced it is, in accordance with well known principles, desirable to so connect or duplicate the coils that the apparatus will be responsive to changes in two or all of the conductors of the system.

I desire to be understood as not limiting myself to any of the mere details of construction or arrangement shown or described herein as my invention as set forth in the appended claims is broader than any such details. It will be understood also that in putting into practice this invention ordinary devices known to the art for adjusting the various apparatus to the different conditions may be provided. In Fig. 1 I have shown a control by the dynamometer of the booster field without the interposition of an exciter, whereas in Fig. 4 I have shown a more indirect control. It will be understood that matters of this kind are to be left with the discretion of the engineer in accordance with the size and character of the plant and the closeness of regulation desired.

Having thus described my invention what I claim as new and desire to protect by Letters Patent is,—

1. The combination with an alternating current generator and circuit, and storage apparatus in operative relation therewith, of regulating apparatus therefor controlled responsively to the variations of the true energy of the alternating current circuit.

2. The combination with an alternating current generator and circuit, and storage apparatus in operative relation therewith, of regulating apparatus therefor controlled responsively to the variations of the product of the electro-motive-force and current of the alternating current circuit and the cosine of the angle of the phase difference between said electro-motive-force and current.

3. The combination with an alternating current generator and circuit, storage apparatus in operative relation therewith, a booster in series with the storage apparatus, and regulating apparatus for the booster field controlled responsively to the variations of the true energy of the alternating current circuit.

4. The combination with an alternating current generator and circuit, storage apparatus in operative relation therewith, a booster in series with the storage apparatus, and regulating apparatus for the booster field controlled responsively to the variations of the product of the electro-motive-force and current of the alternating current circuit and the cosine of the angle of the phase difference between said electro-motive-force and current.

5. The combination with an alternating current generator and circuit, storage apparatus in operative relation therewith, a bolster in series with the storage apparatus, a reversing and current controlling apparatus for affecting the booster field strength, a movable member thereof, and means for controlling the movement of said member responsively to variations of the true energy of the alternating current circuit.

6. The combination with an alternating current generator and circuit, storage apparatus in operative relation therewith, a booster in series with the storage apparatus, a reversing and current controlling apparatus for affecting the booster field strength, a movable member thereof, and means for controlling the movement of said member responsively to variations of the product of the electro-motive force and current of the alternating current circuit and the cosine of the angle of phase difference between said electro-motive-force and current.

7. The combination of an alternating current generator, a rectifier, a storage battery connected to the direct current end of the rectifier, a booster in series with the battery, and regulating apparatus for the booster field controlled by and in accordance with true energy changes of said alternating current generator.

8. The combination of an alternating current generator, a rectifier, a storage battery connected to the direct current end of the rectifier, a booster in series with the battery, and regulating apparatus for the booster field controlled by and in accordance with changes in the product of the current and electro-motive-force of the alternating current generator and the cosine of the angle of phase difference between said current and electro-motive-force.

9. The combination of an alternating current generator, a rectifier, a storage battery connected to the direct current end of the rectifier, a booster in series with the battery, an exciter for the booster, and regulating apparatus for the exciter field controlled by and in accordance with changes in the product of the current and electro-motive-force of the alternating current generator and the cosine of the angle of phase difference between said current and electro-motive-force.

10. The combination of an alternating current generator, a rectifier, a storage battery connected to the direct current end of the rectifier, a booster in series with the battery, a controlling coil therefor subjected to the resultant of opposing potential differences, and regulating apparauts acting to vary one of said potential differences controlled by and in accordance with the true energy changes of the alternating current generator.

11. The combination of an alternating current generator, a rectifier, a storage battery connected to the direct current end of the rectifier, a booster in series with the battery, a controlling coil therefor subjected to the resultant of opposing potential differences, and regulating apparatus acting to vary one of said potential differences controlled by and in accordance with changes in the product of the current and electro-motive-force of the alternating current generator and the cosine of the angle of phase difference between said current and electro-motive-force.

12. The combination of an alternating current generator, a rectifier, a storage battery connected to the direct current end of the rectifier, a booster in series with the battery, an exciter for the booster, a field winding therefor subjected to the resultant of opposing potential differences, and regulating apparatus acting to vary one of said potential differences responsively to changes in the product of the current and electro-motive-force of the alternating current generator and the cosine of the angle of phase difference between said current and electro-motive-force.

13. The combination of an alternating current generator, a rectifier, a storage battery connected to the direct current end of the rectifier, a booster in series with the battery, an exciter for the booster, a field winding therefor subjected to the resultant of opposing potential differences, regulating apparatus acting to vary one of said potential differences, a coil responsive to current changes of the alternating current generator, a coil in magnetic relation therewith responsive to voltage changes of the alternating current generator, one of said coils being movable, and means for governing the operation of said regulating apparatus in accordance with the movement of said moving coil.

14. The combination of an alternating current generator, a rectifier, a storage battery connected to the direct current end of the rectifier, a booster in series with the battery, an exciter for the booster, a field winding therefor subjected to the resultant of opposing potential differences, regulating apparatus acting to vary one of said potential differences, a coil responsive to current changes of the alternating current generator, a coil in magnetic relation therewith responsive to voltage changes of the alternating current generator, one of said coils being movable, mechanical connections between the moving coil and the regulating apparatus tending to actuate the same in one direction, and mechanical means tending to actuate the same in the other direction.

15. The combination of an alternating current generator, a rectifier, a storage battery connected to the direct current end of the rectifier, a booster in series with the battery, a winding for controlling the booster electro-motive-force, a pair of piles of carbon or the like, a connection from said winding to a point between said piles, a movable member arranged to vary the relative resistances of said piles, a coil responsive to current changes of the alternating current generator, a coil in magnetic relation therewith responsive to voltage changes of the alternating current generator, one of said coils being movable and connected to said movable member, and mechanical means acting upon said movable member in the opposite direction.

16. The combination of an alternating current generator, a rectifier, a storage battery connected to the direct current end of the rectifier, a booster in series with the battery, a winding for controlling the booster electro-motive-force, a pair of piles of carbon or the like, a connection from said winding to a point between said piles, a movable member arranged to vary the relative resistances of said piles, a coil responsive to current changes of the alternating current circuit, a coil in magnetic relation therewith responsive to voltage changes of the alternating current circuit, one of said coils being movable and connected to said movable member, and mechanical means acting upon said movable member in the opposite direction.

17. The combination of an alternating current generator, a rectifier, a storage battery connected to the direct current end of the rectifier, a booster in series with the battery, an exciter for said booster, a field winding therefor, a pair of piles of carbon or the like, a connection from said winding to a point between said piles, a movable member arranged to vary the relative resistances of said piles, a coil responsive to current changes of the alternating current generator, a coil in magnetic relation therewith responsive to voltage changes of the alternating current generator, one of said coils being movable and connected to said movable member, and mechanical means acting upon said movable member in the opposite direction.

18. The combination of an alternating current generator, a rectifier, a storage battery connected to the direct current end of the rectifier, a booster in series with the battery, regulating apparatus for the booster including piles of carbon or the like, means for varying the relative pressures exerted upon the two piles, comprising relatively movable coils connected to be respectively responsive to current and voltage changes of the alternating current circuit and mechanical means acting in opposition to the relative movement of said coils.

19. The combination of an alternating current generator, a rectifier, a storage battery connected to the direct current end of the rectifier, a booster in series with the battery, regulating apparatus for the booster including piles of carbon or the like, means for varying the relative pressures exerted upon the two piles, comprising relatively movable coils connected to be respectively responsive to current and voltage changes of the alternating current generator, and mechanical means acting in opposition to the relative movement of said coils.

In testimony whereof, I have signed my name to this specification, in the presence of two subscribing witnesses.

WALTER E. WINSHIP.

Witnesses:
EDWIN SEGER.
A. DALY.

It is hereby certified that in Letters Patent No. 869,286, granted October 29, 1907, upon the application of Walter E. Winship, of New York, N. Y., for an improvement in "Electrical Systems of Distribution," errors appear in the printed specification requiring correction, as follows: In line 76, page 1, the word "will" should read *with*, and in line 125, page 2, the word "bolster" should read *booster;* and that the said Letters Patent should be read with these corrections therein that the same may conform to the record of the case in the Patent Office.

Signed and sealed this 17th day of December, A. D., 1907.

[SEAL.]

C. C. BILLINGS,
*Acting Commissioner of Patents.*